(12) United States Patent
Hitchcock et al.

(10) Patent No.: US 12,431,670 B2
(45) Date of Patent: Sep. 30, 2025

(54) CHARGING INLET ASSEMBLY HAVING A PROXIMITY RESISTOR ASSEMBLY

(71) Applicant: TE CONNECTIVITY SOLUTIONS GMBH, Schaffhausen (CH)

(72) Inventors: Matthew Bryan Hitchcock, Hershey, PA (US); Hurley Chester Moll, Hershey, PA (US); Kevin John Peterson, Kernersville, NC (US); Clara Marguerite Rhodes, Winston Salem, NC (US); Aaron James de Chazal, Rochester, MI (US)

(73) Assignee: TE Connectivity Solutions GmbH (CH)

( * ) Notice: Subject to any disclaimer, the term of this patent is extended or adjusted under 35 U.S.C. 154(b) by 644 days.

(21) Appl. No.: 17/883,762

(22) Filed: Aug. 9, 2022

(65) Prior Publication Data
US 2023/0054502 A1    Feb. 23, 2023

Related U.S. Application Data

(60) Provisional application No. 63/234,673, filed on Aug. 18, 2021.

(51) Int. Cl.
*H01R 13/66* (2006.01)
*B60L 53/16* (2019.01)

(52) U.S. Cl.
CPC .......... *H01R 13/6616* (2013.01); *B60L 53/16* (2019.02); *H01R 2201/26* (2013.01)

(58) Field of Classification Search
CPC .. H01R 13/6616; H01R 2201/26; B60L 53/16
USPC .......................................................... 320/109
See application file for complete search history.

(56) References Cited

U.S. PATENT DOCUMENTS

| | | | | |
|---|---|---|---|---|
| 11,745,614 | B2* | 9/2023 | O'Connor | B60L 53/57 |
| | | | | 320/109 |
| 2013/0187600 | A1* | 7/2013 | Gale | H02J 7/02 |
| | | | | 320/109 |
| 2015/0084579 | A1* | 3/2015 | Li | H02J 7/007182 |
| | | | | 320/139 |
| 2015/0097525 | A1* | 4/2015 | DeDona | B60L 1/006 |
| | | | | 320/109 |
| 2015/0097527 | A1* | 4/2015 | DeDona | B60L 50/16 |
| | | | | 320/109 |

(Continued)

FOREIGN PATENT DOCUMENTS

| CN | 115708276 A | * | 2/2023 | ............. B60L 53/16 |
|---|---|---|---|---|
| CN | 115708277 A | * | 2/2023 | ............. B60L 53/16 |

*Primary Examiner* — Suresh Memula

(57) ABSTRACT

A charging inlet assembly includes a housing having a DC section having DC terminals received in DC terminal channels for mating with the DC charging connector and AC terminals received in AC terminal channels for mating with the AC charging connector. The DC terminals include a proximity terminal and a ground terminal. The proximity and ground terminals include terminating ends received in a rear cavity of the housing. The charging inlet assembly includes a proximity resistor assembly received in the rear cavity having a resistor, a first resistor conductor coupled between the resistor and the terminating end of the proximity terminal, and a second resistor conductor coupled between the resistor and the terminating end of the ground terminal.

20 Claims, 9 Drawing Sheets

(56) References Cited

U.S. PATENT DOCUMENTS

2015/0130414 A1\* 5/2015 Izumi .................. H02J 5/00
320/109

\* cited by examiner

CHARGING INLET ASSEMBLY HAVING A PROXIMITY RESISTOR ASSEMBLY

CROSS REFERENCE TO RELATED APPLICATIONS

This application claims priority to U.S. Provisional Application No. 63/234,673, filed 18 Aug. 2021, the subject matter of which is herein incorporated by reference in its entirety.

BACKGROUND OF THE INVENTION

The subject matter herein relates generally to charging inlet assemblies.

Charging inlet assemblies are used to charge vehicles, such as for charging a battery system of an electric vehicle (EV) or hybrid electric vehicle (HEV). The charging inlet assembly includes power connectors for connecting to a charging connector. Conventional charging inlet assemblies include AC terminals and DC terminals. The AC terminals and the DC terminals are housed within an inlet housing, which interfaces with the charging connector. The inlet housing is coupled to the vehicle. Cable harnesses are coupled to the AC terminals and the DC terminals and extend to other system components, such as the battery. Standards for electrical connectors for electric vehicles, such as the SAE J1772 North American Standard, have signaling protocols to detect connection of the charging plug to the vehicle. For example, the charging inlet assembly typically includes a control circuit board retained within the housing. The control circuit board includes a proximity circuit having a resistor connected between the proximity signal and the ground. The housing includes a large pocket at the rear of the housing that receives the control circuit board. The pocket and the control circuit board increase the overall size, complexity and cost of the charging inlet assembly.

A need remains for an improved charging inlet assembly.

BRIEF DESCRIPTION OF THE INVENTION

In one embodiment, a charging inlet assembly is provided and includes a housing extending between a front and a rear. The housing has a DC section includes DC terminal channels. The housing has an AC section includes AC terminal channels. The DC section configured for mating with a DC charging connector at the front. The AC section configured for mating with an AC charging connector at the front. The housing includes a rear cavity at the rear. The charging inlet assembly includes DC terminals received in the corresponding DC terminal channels for mating with the DC charging connector. The DC terminals include a proximity terminal and a ground terminal. The proximity terminal includes a terminating end received in the rear cavity. The ground terminal includes a terminating end received in the rear cavity. The charging inlet assembly includes AC terminals received in the corresponding AC terminal channels for mating with the AC charging connector. The charging inlet assembly includes a proximity resistor assembly received in the rear cavity. The proximity resistor assembly includes a resistor, a first resistor conductor coupled between the resistor and the terminating end of the proximity terminal, and a second resistor conductor coupled between the resistor and the terminating end of the ground terminal.

In another embodiment, a charging inlet assembly is provided and includes a housing extending between a front and a rear. The housing has a DC section includes DC terminal channels. The housing has an AC section includes AC terminal channels. The DC section configured for mating with a DC charging connector at the front. The AC section configured for mating with an AC charging connector at the front. The housing includes a rear cavity at the rear. The charging inlet assembly includes DC terminals received in the corresponding DC terminal channels for mating with the DC charging connector. The DC terminals include a proximity terminal and a ground terminal. The proximity terminal includes a terminating end received in the rear cavity. The ground terminal includes a terminating end received in the rear cavity. The charging inlet assembly includes AC terminals received in the corresponding AC terminal channels for mating with the AC charging connector. The charging inlet assembly includes a proximity resistor assembly received in the rear cavity. The proximity resistor assembly includes a resistor has a first lead and a second lead, a first resistor contact terminated to the first lead and has a mating end coupled to the terminating end of the proximity terminal, and a second resistor contact terminated to the second lead and has a mating end coupled to the terminating end of the ground terminal.

In a further embodiment, a charging inlet assembly is provided and includes a housing extending between a front and a rear. The housing has a DC section including DC terminal channels. The housing has an AC section includes AC terminal channels. The DC section configured for mating with a DC charging connector at the front. The AC section configured for mating with an AC charging connector at the front. The housing includes a rear cavity at the rear. The charging inlet assembly includes DC terminals received in the corresponding DC terminal channels for mating with the DC charging connector. The DC terminals include a proximity terminal and a ground terminal. The proximity terminal includes a terminating end received in the rear cavity. The ground terminal includes a terminating end received in the rear cavity. The charging inlet assembly includes AC terminals received in the corresponding AC terminal channels for mating with the AC charging connector. The charging inlet assembly includes a proximity resistor assembly received in the rear cavity. The proximity resistor assembly includes a resistor, a first resistor conductor coupled between the resistor and the terminating end of the proximity terminal, and a second resistor conductor coupled between the resistor and the terminating end of the ground terminal. The charging inlet assembly includes a retainer assembly received in the rear cavity rearward of the proximity resistor assembly. The retainer assembly includes a retainer insert holding the resistor in the rear cavity and a seal in the rear cavity being sealing coupled to the housing.

DETAILED DESCRIPTION OF THE INVENTION

Figure 1:
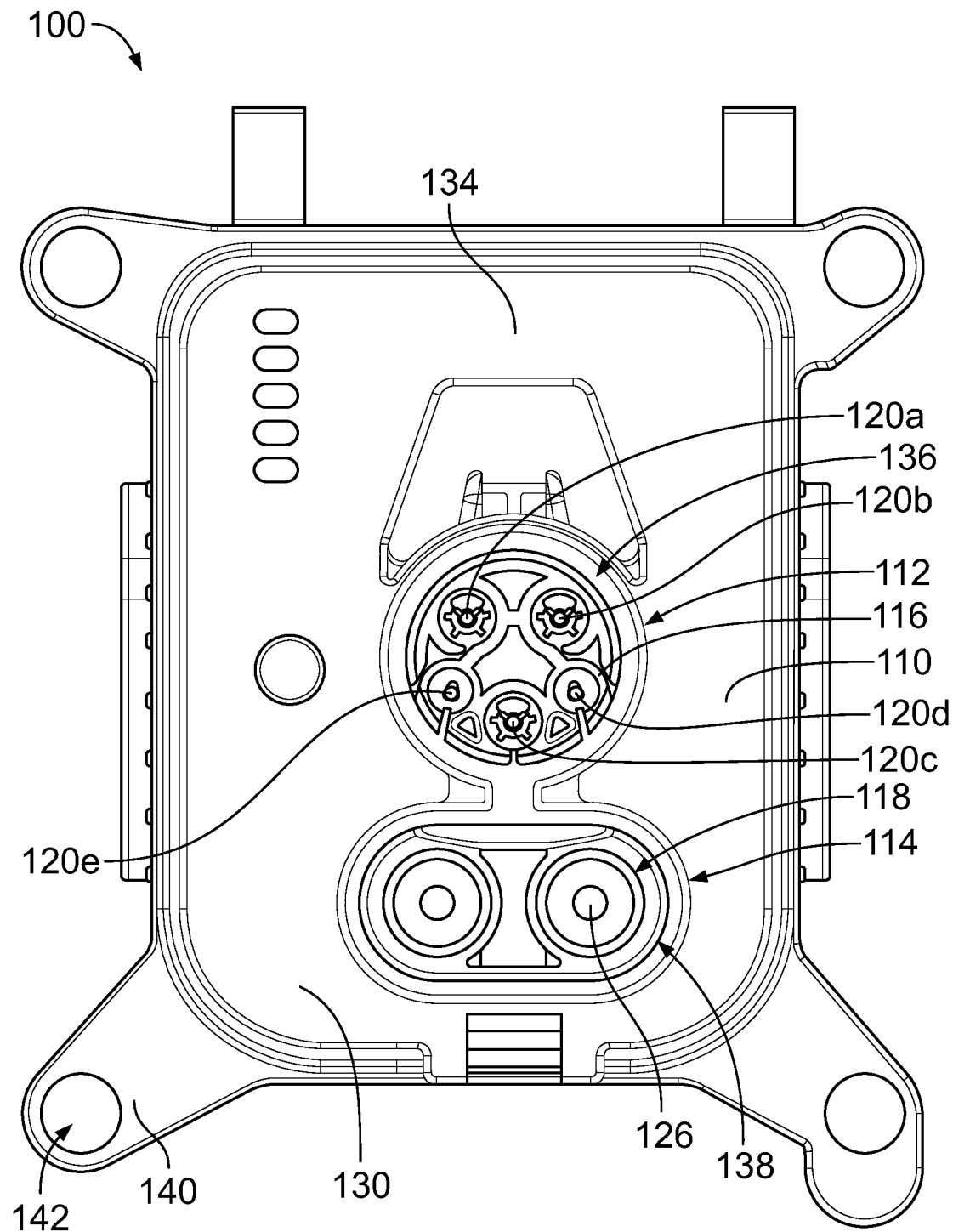
FIG. 1 is a front view of a charging inlet assembly including an AC charging module and a DC charging module in accordance with an exemplary embodiment.
Figure 2:
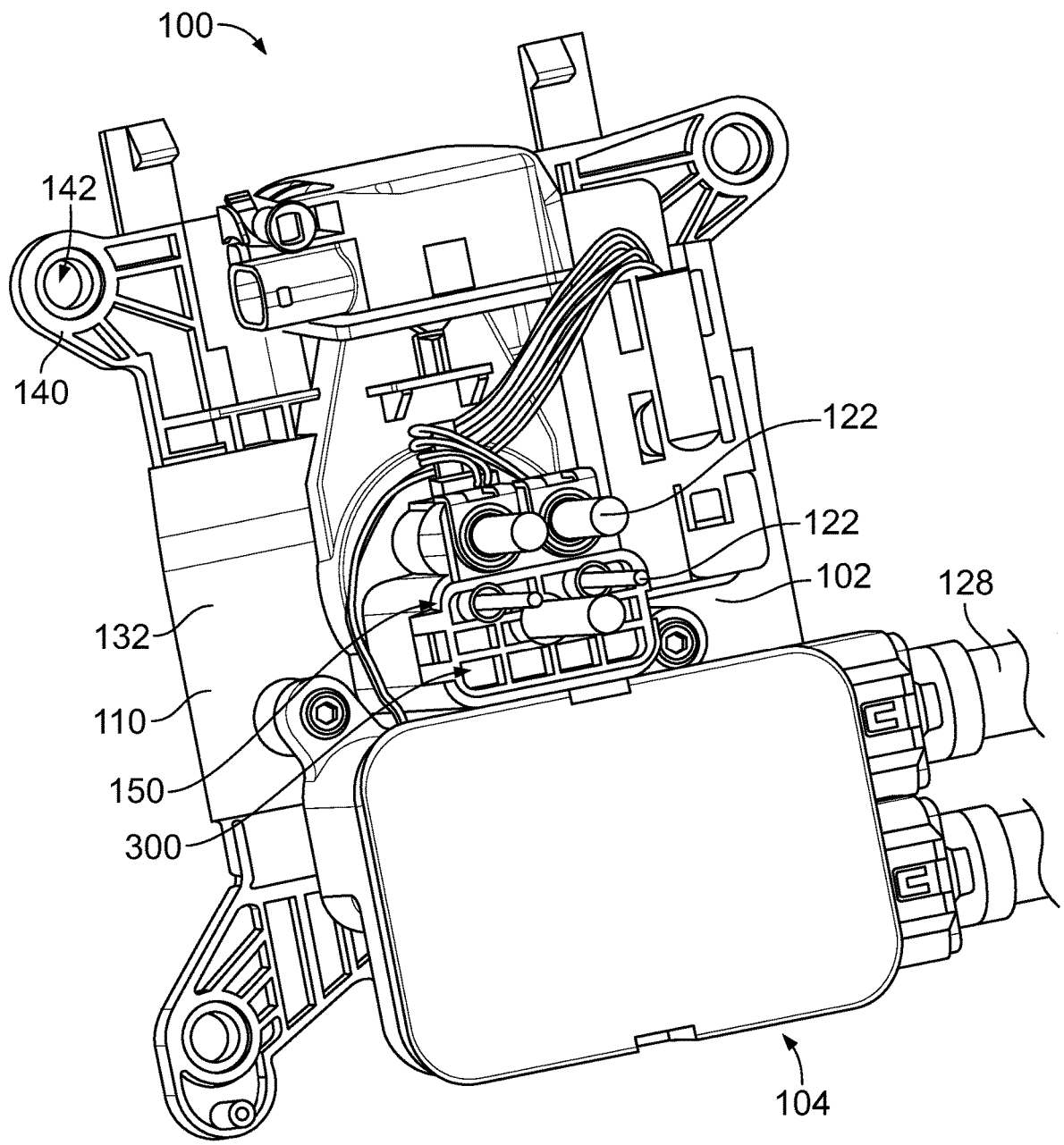
FIG. 2 is a rear perspective view of the charging inlet assembly showing the AC charging module and the DC charging module in accordance with an exemplary embodiment.

FIG. 1 is a front view of a charging inlet assembly 100 including an AC charging module 102 and a DC charging module 104 in accordance with an exemplary embodiment. FIG. 2 is a rear perspective view of the charging inlet assembly 100 showing the AC charging module 102 and the DC charging module 104 in accordance with an exemplary embodiment.

The charging inlet assembly 100 is used as a charging inlet for a vehicle, such as an electric vehicle (EV) or hybrid electric vehicle (HEV). The charging inlet assembly 100 is configured for mating reception with a charging connector (not shown). In an exemplary embodiment, the charging inlet assembly 100 is configured for mating with various types of charging connectors, such as a DC fast charging connector (for example, the SAE combo CCS charging connector) in addition to AC charging connectors (for example, the SAE J1772 charging connector).

The charging inlet assembly 100 includes a housing 110 configured to be mounted in the vehicle. The housing 110 holds the AC charging module 102 and the DC charging module 104 for mating with the charging connector. In various embodiments, the AC charging module 102 and/or the DC charging module 104 are removable from the housing 110. For example, the charging modules 102 may be coupled to the housing 110 using latches, fasteners, clips, or other securing means. The charging modules 102, 104 may be removable from the housing 110 to separate components of the charging modules 102, 104 (for example, charging pins, cables, circuit boards, and the like) from the housing 110, such as for repair and/or replacement of the charging module components or other components of the charging inlet assembly 100.

In an exemplary embodiment, the housing 110 includes an AC section 112 that receives the AC charging module 102 and a DC section 114 that receives the DC charging module 104. The AC section 112 is configured for mating with an AC charging connector or an AC section of the charging connector. The DC section 114 is configured for mating with a DC charging connector or a DC section of the charging connector. The AC section 112 includes AC terminal channels 116. The DC section 114 includes DC terminal channels 118.

The charging inlet assembly 100 includes AC terminals 120 at the AC section 112. The AC terminals 120 are held by the housing 110. The AC terminals 120 are received in corresponding AC terminal channels 116. In various embodiments, the AC terminals 120 may be part of the AC charging module 102 that is coupled to the housing 110. In the illustrated embodiment, five AC terminals 120 are provided, including a first AC charging terminal 120a, a second AC charging terminal 120b, a ground terminal 120c, a proximity terminal 120d, and a pilot terminal 120e. Optionally, the AC terminals 120 may be different sized terminals. In an exemplary embodiment, the AC terminals 120 includes pins at mating ends of the AC terminals 120. AC cables 122 are terminated to the AC terminals 120 and extend from the charging inlet assembly 100 to another component of the vehicle, such as the battery system of the vehicle. The AC terminals 120 are configured to be mated to the charging connector.

In an exemplary embodiment, the AC section 112 of the charging inlet assembly 100 defines a low-voltage connector configured to be coupled to the low-voltage portion of the charging connectors. The low-voltage connector (for example, the AC terminals 120 and the AC cables 122) is configured to be coupled to other components in the system, such as a battery distribution unit, to control charging of the vehicle. The low-voltage connector may transmit/receive signals relating to charging, such as status of connection, status of charge, voltage of charge, and the like. The low-voltage connector may be socket connector configured to receive the charging plug. Seals may be provided at the interface of the low-voltage connector.

The charging inlet assembly 100 includes DC terminals 126 at the DC section 114. The DC terminals 126 are held by the housing 110. The DC terminals 126 are received in corresponding DC terminal channels 118. In various embodiments, the DC terminals 126 may be part of the DC charging module 104 that is coupled to the housing 110. In the illustrated embodiment, two DC terminals 126 are provided. In an exemplary embodiment, the DC terminals 126 includes pins at mating ends of the DC terminals 126. DC cables 128 are terminated to the DC terminals 126 and extend from the charging inlet assembly 100 to another component of the vehicle, such as the battery system of the vehicle. The DC terminals 126 are configured to be mated to the charging connector.

In an exemplary embodiment, the DC section 114 of the charging inlet assembly 100 defines a high-voltage connector configured to be coupled to the high-voltage portion of the charging connector. The high-voltage connector (for example, the DC terminals 126 and the DC cables 128) is configured to be coupled to other components in the system, such as the battery and/or the battery distribution unit of the vehicle. The high-voltage connector is used for fast charging of the battery. The high-voltage connector may be socket connector configured to receive the charging plug. Seals may be provided at the interface of the high-voltage connector.

The housing 110 includes a front 130 and a rear 132. The front 130 of the housing 110 faces outward and is presented to the operator to connect the charging connector. The rear 132 faces the interior of the vehicle and is generally inaccessible without removing the housing 110 from the vehicle. In an exemplary embodiment, the housing 110 includes a panel 134 at the front 130. In an exemplary embodiment, an AC socket 136 is formed in the panel 134 at the AC section 112 and a DC socket 138 is formed in the panel 134 at the DC section 114. The AC socket 136 incudes a space around the AC terminals 120 that receives the charging connector. During charging, the AC charging connector is plugged into the AC socket 136 to electrically connect to the AC terminals 120. The DC socket 138 includes a space around the DC terminals 126 that receive the charging connector. The DC charging connector is configured to be plugged into the DC socket 138. During charging, the DC charging connector is plugged into the DC socket 138 to electrically connect to the DC terminals 128. The panel 134 may surround the AC socket 136 and the DC socket 138 at the front 130.

In an exemplary embodiment, the housing 110 includes a rear cavity 150 at the rear 132. In the illustrated embodiment, the rear cavity 150 is provided at the AC section 112. The rear cavity 150 receives the AC terminals 120 and the AC cables 122. In an exemplary embodiment, the charging inlet assembly 100 includes a proximity resistor assembly 200 received in the rear cavity 150. In an exemplary embodiment, the proximity resistor assembly 200 provides a resistor between the proximity terminal 120d and the ground terminal 120c, such as for operating a signaling protocol for performing the charging operation. A retainer assembly 300 is used to hold the proximity resistor assembly 200 in the rear cavity 150. The retainer assembly 300 may be used to retain the AC terminals 120 and/or the AC cables 122 in the rear cavity 150.

In an exemplary embodiment, the housing 110 includes mounting tabs 140 used for mounting the housing 110 to the vehicle. The mounting tabs 140 having openings 142 that receive fasteners (not shown) to secure the charging inlet assembly 100 to the vehicle. Other types of mounting features may be used to secure the charging inlet assembly 100 to the vehicle. In various embodiments, the charging inlet assembly 100 may include a mounting flange (not shown) coupled to the front of the housing 110 for mounting the charging inlet assembly 100 to the vehicle. The housing 110 and/or the mounting flange may include a seal (not shown) to seal the charging inlet assembly 100 to the vehicle. In various embodiments, the charging inlet assembly 100 may include a terminal cover (not shown) at the front of the housing 110 to cover portions of the housing 110, such as the DC section 114 and/or the AC section 112. The housing 110 may include one or more rear covers at the rear of the housing 110 to close access to the rear of the housing 110. The cover(s) may be clipped or latched onto the main part of the housing 110, such as using clips or latches. Other types of securing features, such as fasteners may be used in alternative embodiments.

Figure 3:
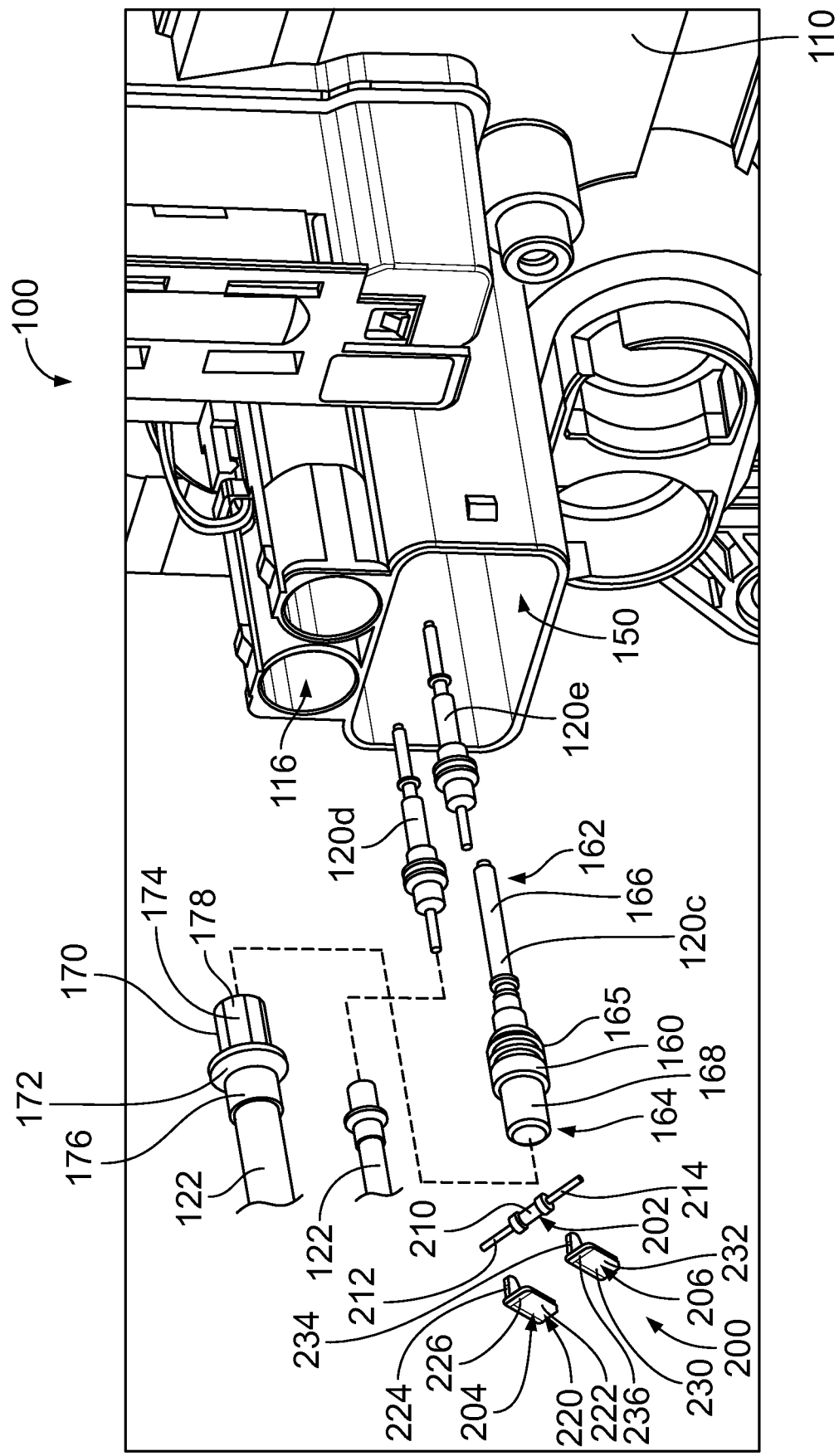
FIG. 3 is a rear perspective, exploded view of a portion of the charging inlet assembly in accordance with an exemplary embodiment.

FIG. 3 is a rear perspective, exploded view of a portion of the charging inlet assembly 100 in accordance with an exemplary embodiment. FIG. 3 shows a plurality of the AC terminals 120 configured to be loaded into the rear cavity 150. For example, the ground terminal 120c, the proximity terminal 120d, and the pilot terminal 120e are shown in FIG. 3. FIG. 3 shows the proximity resistor assembly 200 configured to be coupled to the AC terminals 120, such as the ground terminal 120c and the proximity terminal 120d. FIG. 3 shows the AC cables 122 configured to be coupled to the AC terminals 120.

Each AC terminal 120 includes a main body 160 extending between a mating end 162 and a terminating end 164. In an exemplary embodiment, a terminal seal 165 is coupled to the main body 160. The terminal seal 165 is configured to be sealed to the housing 110 when the AC terminal 120 is received in the AC terminal channel 116. The AC terminal 120 includes a mating pin 166 at the mating end 162. The mating pin 166 is presented at the front 130 of the housing 110 for mating with the charging connector. The AC terminal 120 includes a post 168 at the terminating end 164 for electrical connection with the AC cables 122. Other types of terminating ends may be provided in alternative embodiments, such as a weld pad or a crimp barrel.

In an exemplary embodiment, an AC contact 170 is terminated to the end of the AC cable 122. The AC contact 170 is configured to be electrically connected to the terminating end 164 of the AC terminal 120. For example, the AC contacts 170 may be press-fit on to the post 168 of the AC terminal 120. The AC contact 170 may be electrically connected by other processes, such as welding or soldering in alternative embodiments. In other embodiments, the AC cable 122 is terminated directly to the terminating end 164 of the AC terminal 120. The AC contact 170 includes a flange 172 between a front portion 174 and a rear portion 176. In an exemplary embodiment, the front portion 174 includes contact fingers 178 configured to be coupled to the post 168 of the AC terminal 120. The contact fingers 178 may be deflectable to mechanically and electrically connect to the AC terminal 120. In an exemplary embodiment, the contact fingers 178 may be press-fit on to the post 168 of the AC terminal 120.

In an exemplary embodiment, the proximity resistor assembly 200 includes a resistor 202, a first resistor conductor 204 and a second resistor conductor 206. The resistor 202, the first resistor conductor 204, and the second resistor conductor 206 are configured to be loaded into the rear cavity 150 of the housing 110. The resistor 202 and/or the first resistor conductor 204 and/or the second resistor conductor 206 may be held in the housing 110, such as by an interference fit. The first resistor conductor 204 is configured to be coupled between the resistor 202 and the proximity terminal 120d. The second resistor conductor 206 is configured to be coupled between the resistor 202 and the ground terminal 120c.

The resistor 202 includes a resistor element 210, a first lead 212 extending from a first side of the resistor element 210 and a second lead 214 extending from a second side of the resistor element 210. In an exemplary embodiment, the resistor 202 is a 2.7 kOhm resistor. However, the resistor 202 may have other resistance values in alternative embodiments.

In an exemplary embodiment, the first resistor conductor 204 includes a first resistor contact 220. The first resistor contact 220 is a stamped and formed contact. The first resistor contact 220 includes a main body 222, a first mating tab 224 extending from the main body 222 and a second mating tab 226 extending from the main body 222. The first mating tab 224 is configured to be coupled to the first lead 212 of the resistor 202. In various embodiments, the first mating tab 224 may be an insulation displacement contact configured to be press-fit onto the first lead 212. The first mating tab 224 may be electrically connected to the first lead 212 by other processes in alternative embodiments, such as being welded or soldered to the first lead 212 or being crimped to the first lead 212. The second mating tab 226 is a spring beam configured to engage the AC terminal 120. For example, the second mating tab 226 may engage the post 168 of the AC terminal 120 when the first resistor contact 220 is loaded into the housing 110. The second mating tab 226 may be spring biased against the post 168 of the AC terminals 120 when mated thereto to maintain mechanical and electrical connection between the second mating tab 226 and the AC terminal 120.

In an exemplary embodiment, the second resistor conductor 206 includes a second resistor contact 230. The second resistor contact 230 is a stamped and formed contact. The second resistor contact 230 includes a main body 232, a first mating tab 234 extending from the main body 232 and a second mating tab 236 extending from the main body 232. The first mating tab 234 is configured to be coupled to the second lead 214 of the resistor 202. In various embodiments, the first mating tab 234 may be an insulation displacement contact configured to be press-fit onto the second lead 214. The first mating tab 234 may be electrically connected to the second lead 214 by other processes in alternative embodiments, such as being welded or soldered to the second lead 214 or being crimped to the second lead 214. The second mating tab 236 is a spring beam configured to engage the AC terminal 120. For example, the second mating tab 236 may engage the post 168 of the AC terminal 120 when the second resistor contact 230 is loaded into the housing 110. The second mating tab 236 may be spring biased against the post 168 of the AC terminals 120 when mated thereto to maintain mechanical and electrical connection between the second mating tab 236 and the AC terminal 120.

Figure 4:
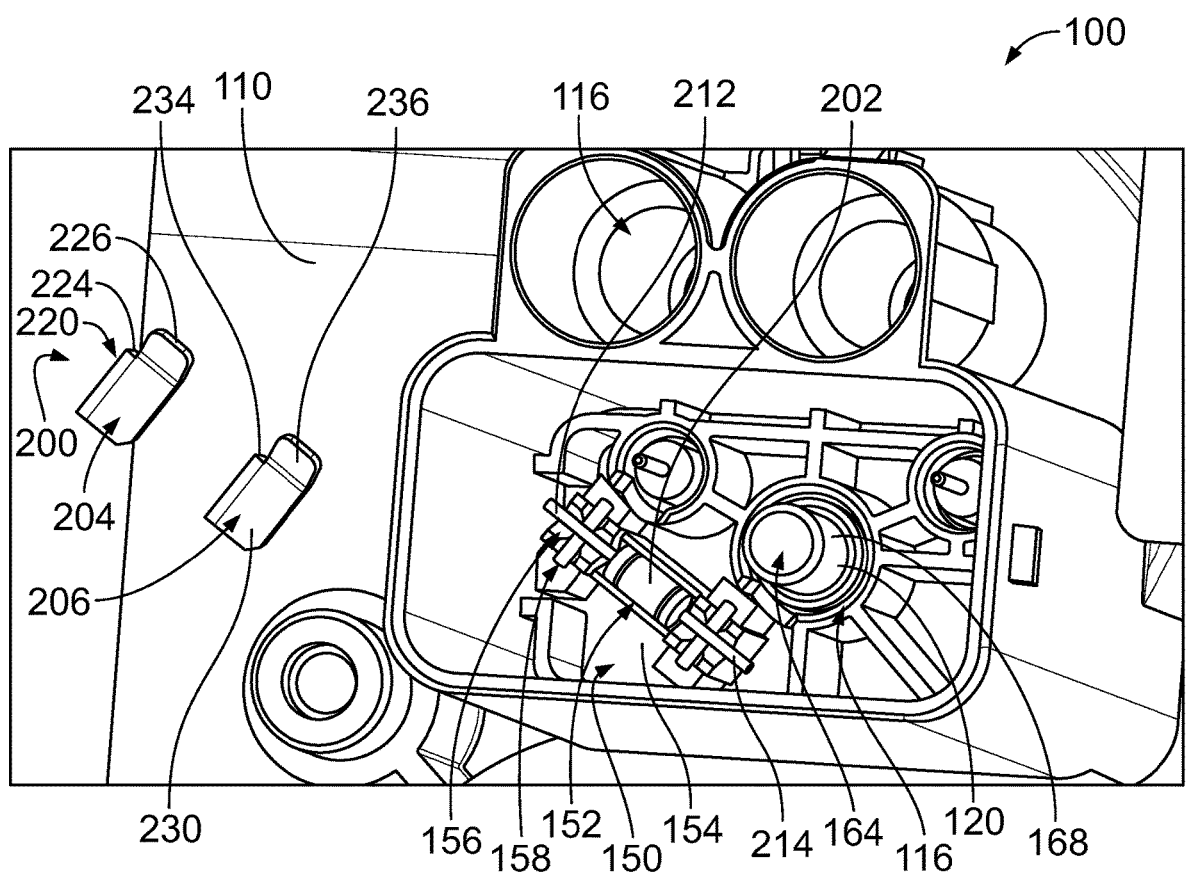
FIG. 4 is a rear perspective view of a portion of the charging inlet assembly in accordance with an exemplary embodiment showing the first and second resistor conductors poised for loading into the housing.
Figure 5:
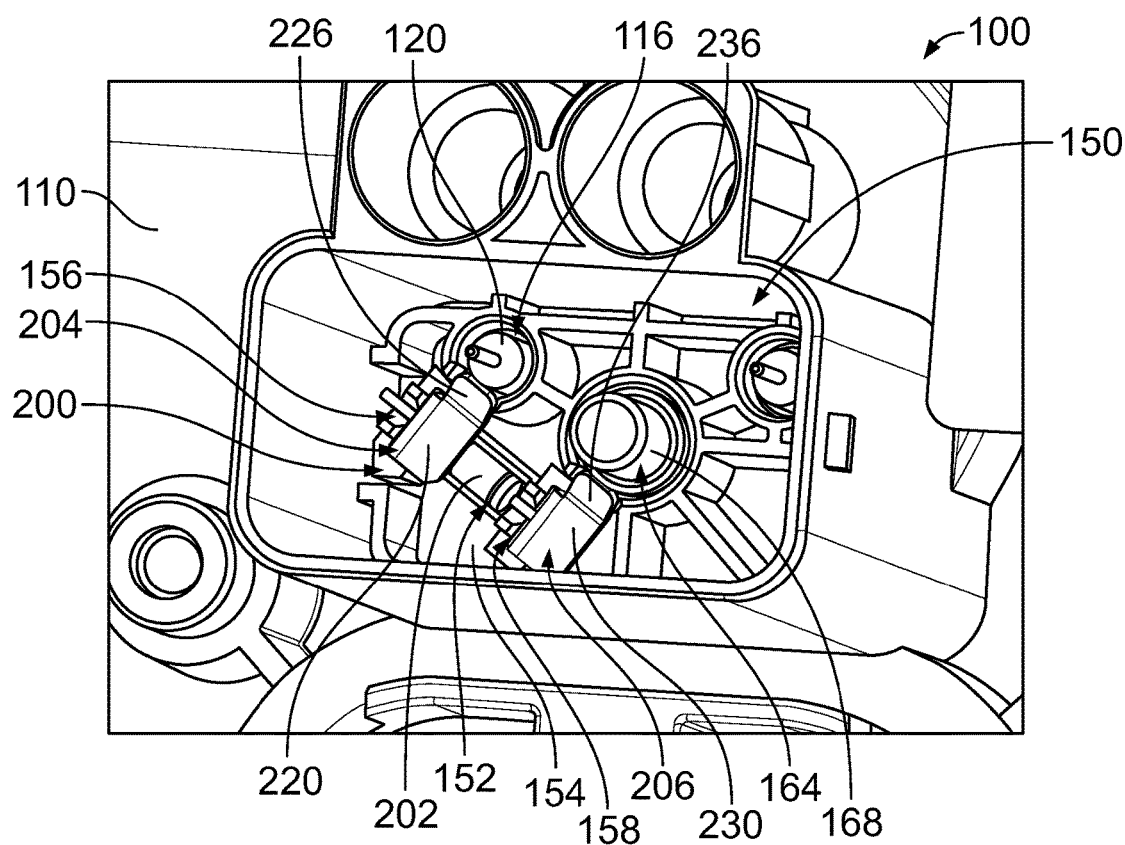
FIG. 5 is a rear perspective view of a portion of the charging inlet assembly 100 in accordance with an exemplary embodiment showing the first and second resistor conductors loaded into the housing and electrically connected between the resistor in the corresponding AC terminals.

FIG. 4 is a rear perspective view of a portion of the charging inlet assembly 100 in accordance with an exemplary embodiment showing the first and second resistor conductors 204, 206 poised for loading into the housing 110. FIG. 5 is a rear perspective view of a portion of the charging inlet assembly 100 in accordance with an exemplary embodiment showing the first and second resistor conductors 204, 206 loaded into the housing 110 and electrically connected between the resistor 202 in the corresponding AC terminals 120. FIGS. 4 and 5 shows a plurality of the AC terminals 120 loaded into corresponding AC terminal channels 116 of the housing 110. The terminating ends 164 of the AC terminals 120 extend into the rear cavity 150.

During assembly, the resistor 202 of the proximity resistor assembly 200 is loaded in the rear cavity 150. In an exemplary embodiment, the housing 110 includes a nest 152 in an end wall 154 of the housing 110. The end wall 154 is located at a front of the rear cavity 150. The AC terminal channels 116 extend through the end wall 154. The nest 152 is open at the rear side of the end wall 154 to receive the resistor 202. In an exemplary embodiment, the resistor 202 may be held in the nest 152 by an interference fit.

In an exemplary embodiment, the housing 110 includes pockets 156 in the end wall 154 that receive the leads 212, 214 of the resistor 202. In various embodiments, the pockets 156 may be V-shaped. The housing 110 includes contact channels 158 in the end wall 154 adjacent the pockets 156. The contact channels 158 are configured to receive the resistor contacts 220, 230. For example, the mating tabs 224, 234 of the resistor contacts 220, 230 are received in the contact channels 158. The contact channels 158 are aligned with the pockets 156 to couple the mating tabs 224, 234 with the leads 212, 214, respectively. For example, the mating tabs 224, 234 may interface with the leads 212, 214 as the resistor contacts 220, 230 are loaded into the contact channels 158. The mating tabs 224, 234 may be held in the contact channels 158 by an interference fit. In an exemplary embodiment, the contact channels 158 are located relative to the AC terminal channels 116 to position the resistor contacts 220, 230 for mating with the AC terminals 120. For example, the mating tabs 226, 236 may engage the posts 168 of the AC terminals 120 when the resistor contacts 220, 230 are received in the contact channels 158.

Figure 6:
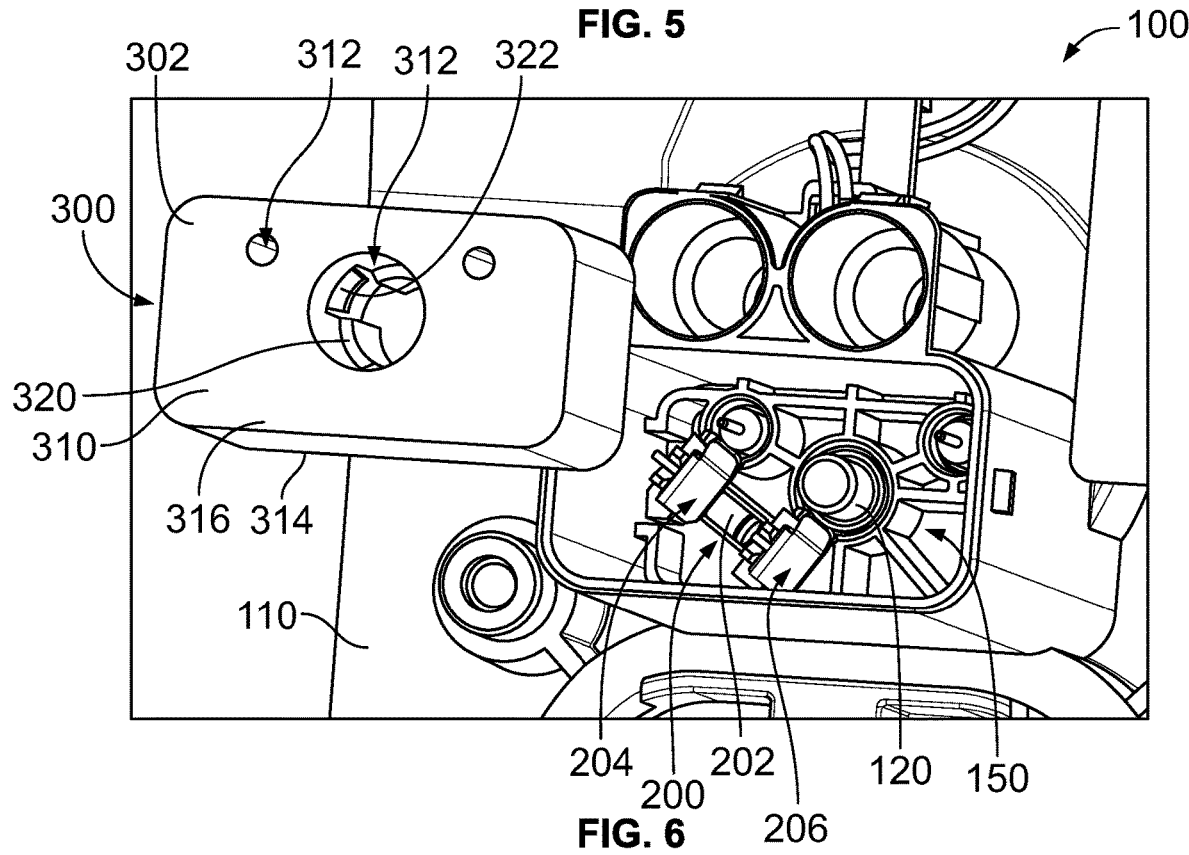
FIG. 6 is a rear perspective view of a portion of the charging inlet assembly in accordance with an exemplary embodiment showing the retainer assembly poised for loading into the housing.
Figure 7:
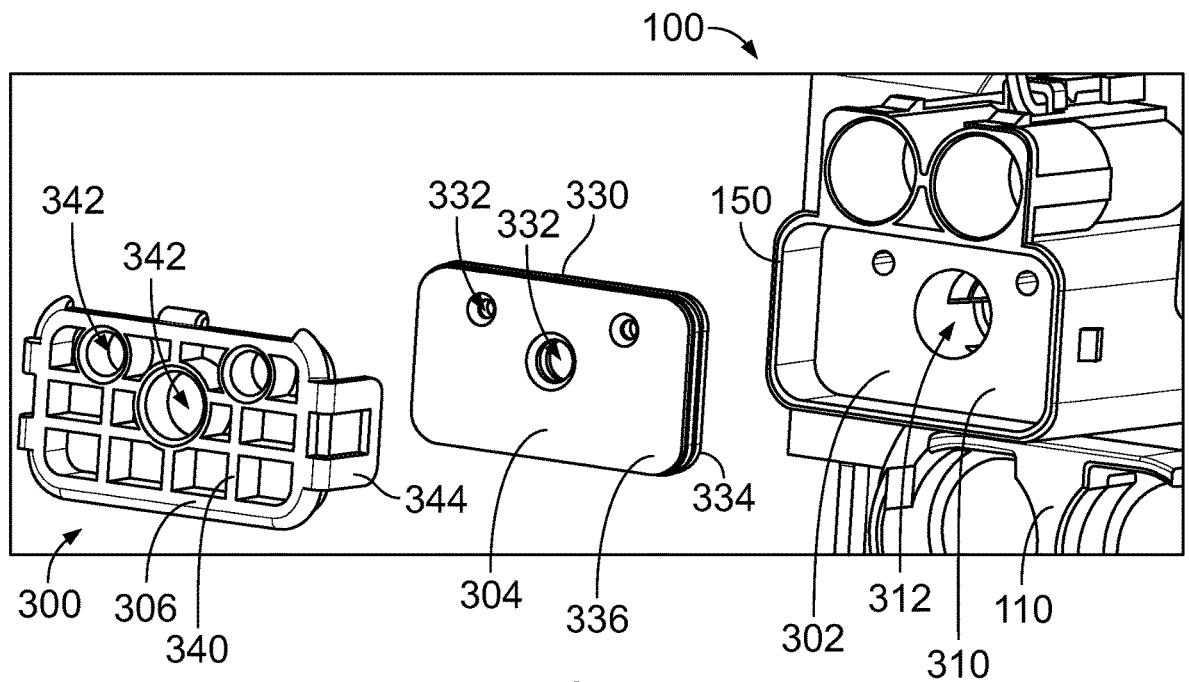
FIG. 7 is a rear perspective view of a portion of the charging inlet assembly in accordance with an exemplary embodiment showing the retainer assembly poised for loading into the housing.
Figure 8:
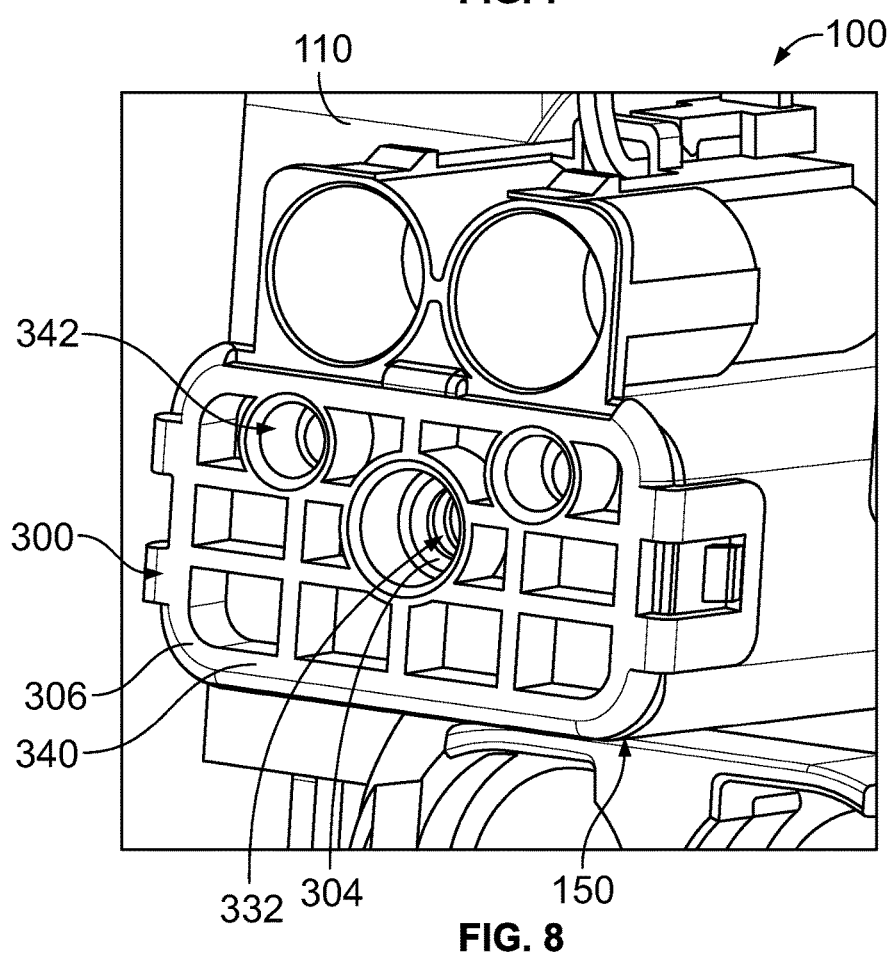
FIG. 8 is a rear perspective view of a portion of the charging inlet assembly in accordance with an exemplary embodiment showing the retainer assembly coupled to the housing.

FIG. 6 is a rear perspective view of a portion of the charging inlet assembly 100 in accordance with an exemplary embodiment showing the retainer assembly 300 poised for loading into the housing 110. FIG. 7 is a rear perspective view of a portion of the charging inlet assembly 100 in accordance with an exemplary embodiment showing the retainer assembly 300 poised for loading into the housing 110. FIG. 8 is a rear perspective view of a portion of the charging inlet assembly 100 in accordance with an exemplary embodiment showing the retainer assembly 300 coupled to the housing 110.

The retainer assembly 300 includes a retainer insert 302, a seal 304, and a cover 306. FIG. 6 shows the retainer insert 302 poised for loading into the rear cavity 150. FIG. 7 shows the retainer insert 302 loaded into the rear cavity 150 and showing the seal 304 and the cover 306 poised for coupling to the housing 110. FIG. 8 shows the cover 306 coupled to the housing 110. The retainer insert 302 is loaded into the rear cavity 150 after the proximity resistor assembly 200 is loaded in the rear cavity 150 and coupled to the corresponding AC terminals 120. The retainer insert 302 may be used to hold the resistor 202 and the resistor conductors 204, 206 in the rear cavity 150. The seal 304 is configured be received in the rear cavity 150 behind the retainer insert 302 to seal the rear cavity 150. The cover 306 is coupled to the housing 110 to close the rear cavity 150 and hold the seal 304 in the rear cavity 150.

In an exemplary embodiment, the retainer insert 302 is a block 310 having a complementary shape as the rear cavity 150 to fill the rear cavity 150. In various embodiments, the block 310 is manufactured from a dielectric material, such as a plastic material. The block 310 may be molded from a plastic material. The retainer insert 302 includes bores 312 extending between a front 314 and a rear 316 of the retainer insert 302. The bores 312 are configured to receive the AC terminals 120 and/or the AC cables 122 and or the AC contacts 170. In an exemplary embodiment, the retainer insert 302 is used to retain the AC contacts 170 therein to hold the AC contacts 170 in mechanical and electrical connection with the AC terminal 120. In an exemplary embodiment, the retainer insert 302 includes a stop shoulder 320 in the bore 312. The AC contact 170 may be loaded against the stop shoulder 320. The stop shoulder 320 is used to position the AC contact 170 within the bore 312. In an exemplary embodiment, the retainer insert 302 includes one or more latches 322 extending into each bore 312. The latches 322 are used to retain the AC contact 170 in the bore 312. For example, the flange 172 of the AC contact 170 may be held between the stop shoulder 320 and the latch 322.

The seal 304 is used to provide an environmental ceiling for the rear cavity 150. For example, the seal 304 may be used to provide ceiling for the proximity resistor assembly 200. The seal 304 is manufactured from an elastomer material, such as a rubber material. The seal 304 includes an outer edge 330 extending between a front 334 and a rear 336. The outer edge 330 is configured to be sealed against the interior walls of the housing 110 defining the rear cavity 150. The front 334 may be sealed against the retainer insert 302. The rear 336 may be sealed against the cover 306. In an exemplary embodiment, the seal 304 includes bores 332 extending therethrough between the front 334 and the rear 336. Each bore 332 is configured to receive the corresponding AC cable 122 and/or the AC contact 170 to seal against the AC cable 122 and/or the AC contact 170.

The cover 306 includes an end wall 340 used to close off the housing 110 at the rear cavity 150. The end wall 340 may have a complementary shape to the walls defining the rear cavity 150. In an exemplary embodiment, the end wall 340 includes bores 342 extending therethrough. Each bore 342 is configured to receive the corresponding AC cable 122 and/or the AC contact 170. In an exemplary embodiment, the cover 306 includes latches 344 extending from the end wall 340 configured to be latchably coupled to the housing 110. Other types of securing features may be used in alternative embodiments, such as fasteners, clips, and the like.

Figure 9:
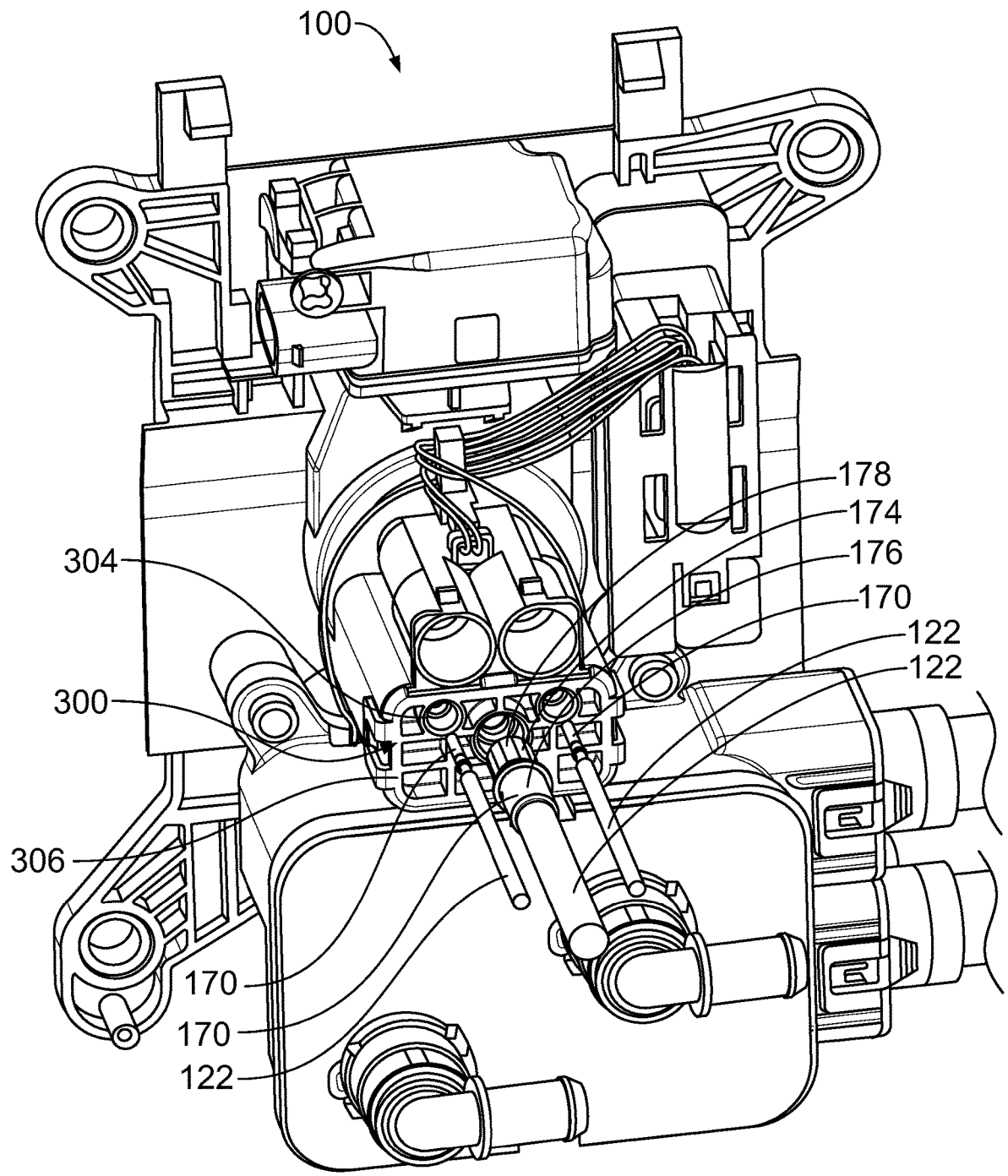
FIG. 9 is a rear perspective view of a portion of the charging inlet assembly in accordance with an exemplary embodiment showing the AC cables and the AC contacts poised for loading into the retainer assembly for electrical connection to the corresponding AC terminals.
Figure 10:
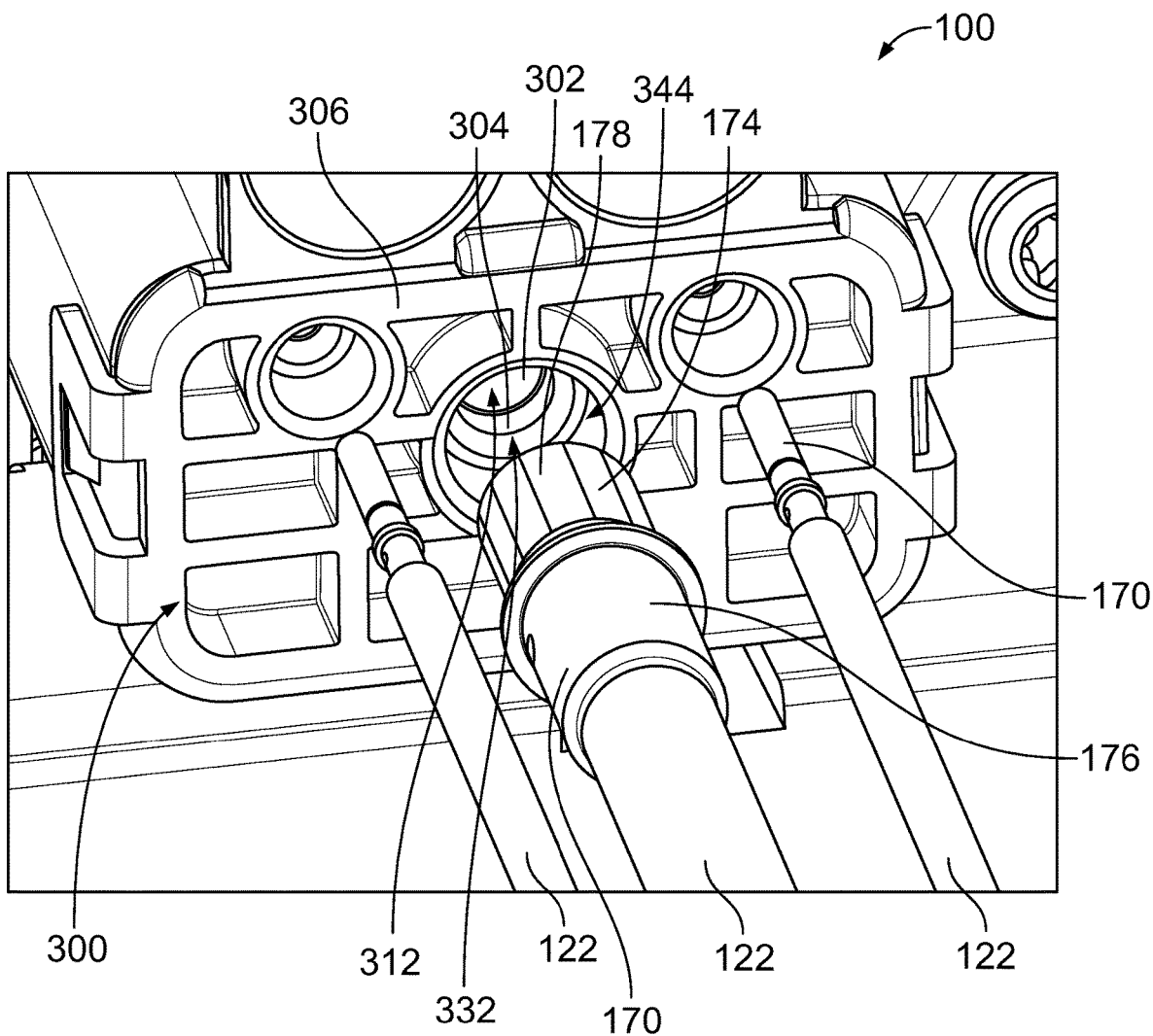
FIG. 10 is an enlarged rear perspective view of a portion of the charging inlet assembly in accordance with an exemplary embodiment showing the AC cables and the AC contacts poised for loading into the retainer assembly for electrical connection to the corresponding AC terminals.

FIG. 9 is a rear perspective view of a portion of the charging inlet assembly 100 in accordance with an exemplary embodiment showing the AC cables 122 and the AC contacts 170 poised for loading into the retainer assembly 300 for electrical connection to the corresponding AC terminals 120. FIG. 10 is an enlarged rear perspective view of a portion of the charging inlet assembly 100 in accordance with an exemplary embodiment showing the AC cables 122 and the AC contacts 170 poised for loading into the retainer assembly 300 for electrical connection to the corresponding AC terminals 120.

The AC contacts 170 are terminated to the ends of the AC cables 122. For example, the rear portions 176 of the AC contacts 170 may be crimped onto the ends of the AC cables 122. During assembly, the AC contacts 170 and the AC cables 122 are poked into the retainer assembly 300 for electrical connection to the AC terminals 120. For example, the AC contacts 170 and the AC cables 122 are loaded into the corresponding bores 342 of the cover 306, through the bores 332 in the seal 304, into the bores 312 of the retainer insert 302. The front portions 174 of the AC contacts 170 may be pressed onto the posts 168 at the terminating ends 164 of the AC terminals 120. The contact fingers 178 between the AC contacts 170 and the AC terminals 120 to mechanically and electrically connect the AC contacts 170 and the AC terminals 120. The seal 304 provides an environmental seal against the AC cables 122 to prevent moisture or debris from entering the retainer assembly 300.

Figure 11:
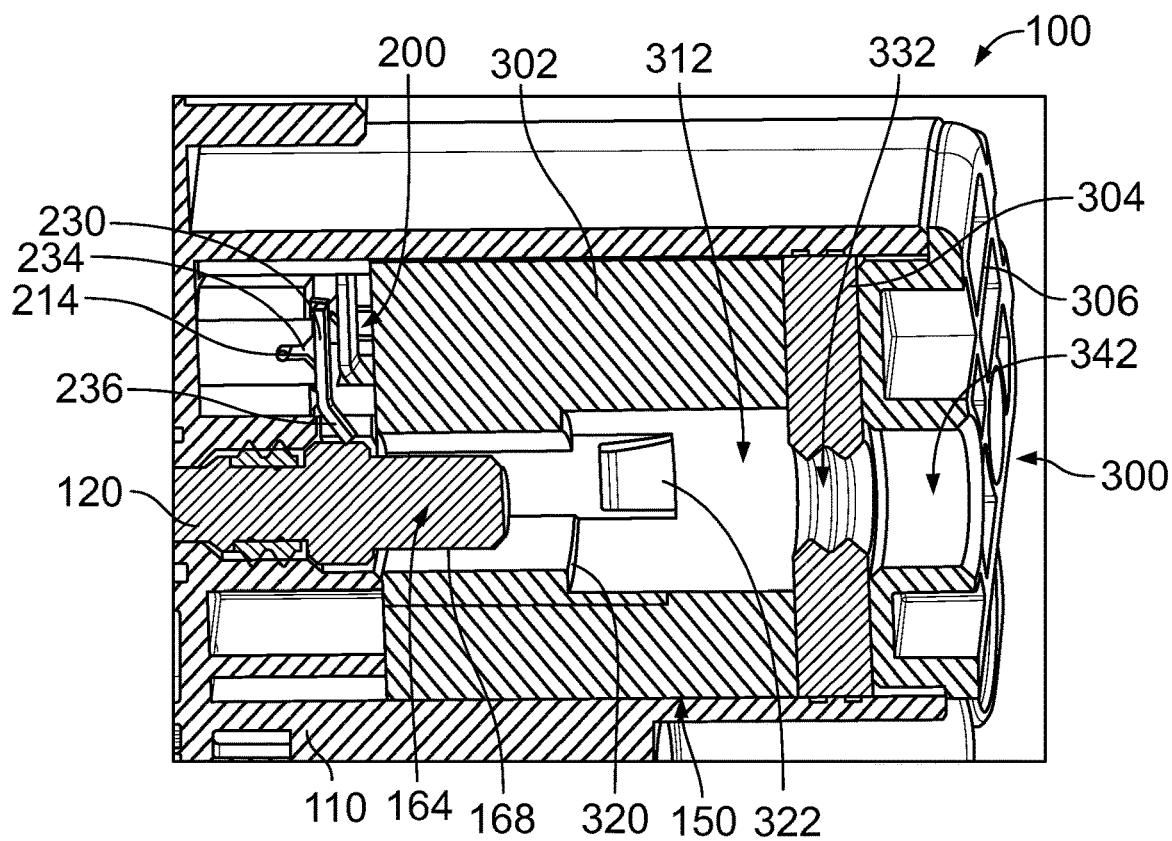
FIG. 11 is a cross sectional view of a portion of the charging inlet assembly in accordance with an exemplary embodiment prior to connecting the AC cable and the AC contact to the AC terminals.
Figure 12:
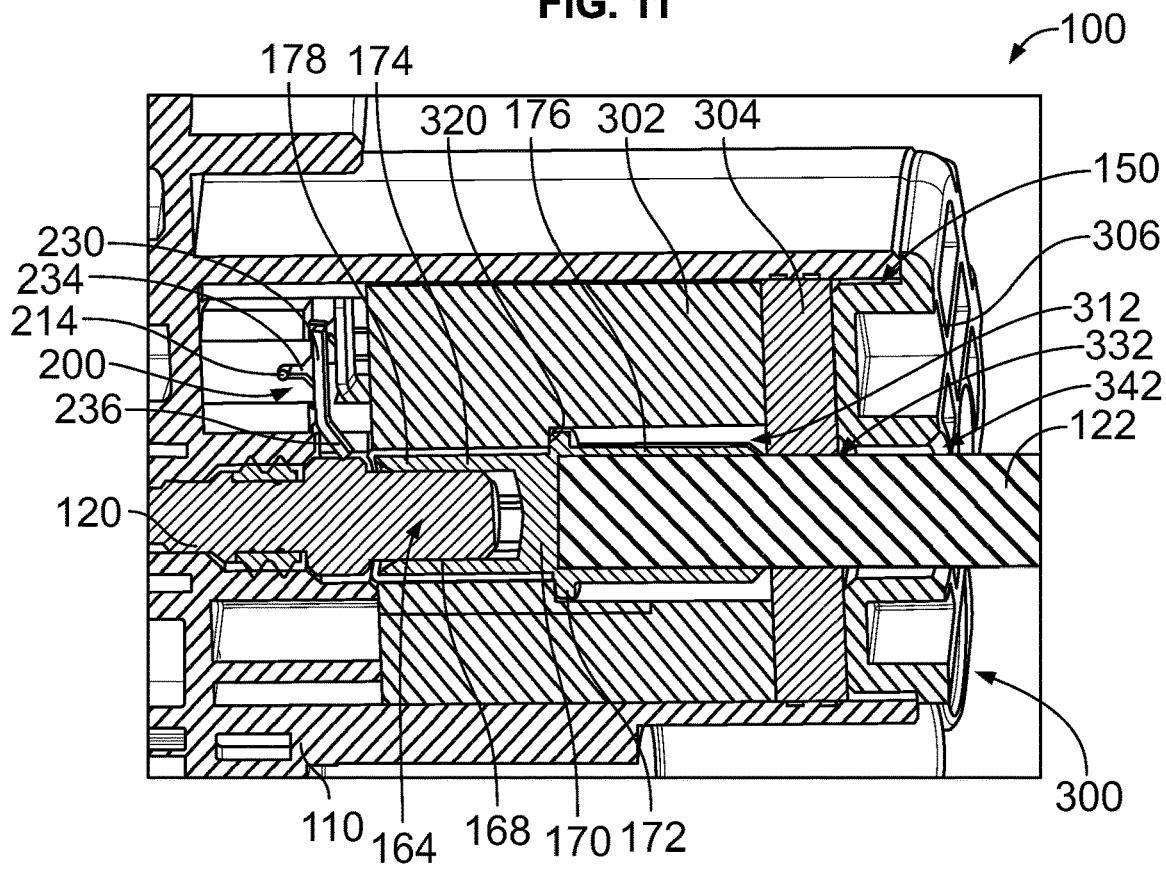
FIG. 12 is a cross sectional view of a portion of the charging inlet assembly in accordance with an exemplary embodiment showing the AC cable and the AC contact received in the retainer assembly and coupled to the corresponding AC terminal.

FIG. 11 is a cross sectional view of a portion of the charging inlet assembly 100 in accordance with an exemplary embodiment prior to connecting the AC cable 122 and the AC contact 170 to the AC terminals 120. FIG. 12 is a cross sectional view of a portion of the charging inlet assembly 100 in accordance with an exemplary embodiment showing the AC cable 122 and the AC contact 170 received in the retainer assembly 300 and coupled to the corresponding AC terminal 120. FIGS. 11 and 12 illustrate the proximity resistor assembly 200 coupled to the AC terminal 120.

The second resistor contact 230 is shown connected to the resistor 202 and the AC terminal 120. The first mating tab 234 is coupled to the second lead 214 of the resistor 202. The second mating tab 236 is coupled to the post 168 of the AC terminal 120. The second resistor contact 230 creates an electrical path between the AC terminal 120 and the resistor 202. A reliable connection is made between the proximity terminal and the ground terminal by the proximity resistor assembly 200. The resistor circuit used to satisfy the sensing protocol for the SAE J1772 North American Standard is made by the proximity resistor assembly 200. The resistor 202 is connected directly between the proximity terminal and the ground terminal without the need for additional printed circuit boards or other circuitry. The proximity resistor assembly 200 occupies a very small space within the rear cavity 150, which may reduce the overall size of the charging inlet assembly 100 compared to charging inlet assemblies having separate control circuit boards and housing spaces four such control circuit boards.

When assembled, the retainer assembly 300 is coupled to the housing 110. The retainer insert 302 is received in the rear cavity 150 and located rearward of the proximity resistor assembly 200. The seal 304 is located rearward of the retainer insert 302 and the cover 306 is located rearward of the seal 304. The cover 306 holds the seal 304 and the retainer insert 302 and the rear cavity 150. The bore 332 of the seal 304 and the bore 342 of the cover 306 are aligned with the bore 312 of the retainer insert 302 to receive the AC contact 170 and the AC cables 122. In an exemplary embodiment, the seal 304 is sealingly coupled to the AC cables 122 to prevent moisture and debris from flowing through the bores. The outer edge 330 of the seal 304 is sealingly coupled to the walls of the housing 110 defining the rear cavity 150 to prevent moisture and debris from flowing into the rear cavity 150.

In an exemplary embodiment, the terminating end 164 of the AC terminal 120 is received in the front portion of the bore 312 of the retainer insert 302. The front portion of the bore 312 is located forward of the stop shoulder 320. The AC contact 170 and the AC cables 122 are plugged into the retainer assembly 300 to mate with the post 168 of the AC terminal 120. The AC contacts 170 is loaded into the retainer assembly 300 until the front surface of the flange 172 bottoms out against the stop shoulder 320. The latch 322 is configured to latchably coupled to the rear surface of the flange 172. The flange 172 is configured to be captured between the stop shoulder 320 and the latch 322 to securely retain the AC contact 170 in the retainer insert 302. When the AC contacts 170 is plugged into the retainer assembly 300, the front portion 174 of the AC contact 170 receives the posts 168 of the AC terminal 120. The contact fingers 178 are press-fit coupled to the post 168 of the AC terminal 120. A simple and reliable electrical connection is made between the AC contacts 170 and the AC terminal 120. Assembly can be made quickly and easily.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A charging inlet assembly comprising:
a housing extending between a front and a rear, the housing having a DC section including DC terminal channels, the housing having an AC section including AC terminal channels, the DC section configured for mating with a DC charging connector at the front, the AC section configured for mating with an AC charging connector at the front, the housing including a rear cavity at the rear;
DC terminals received in the corresponding DC terminal channels for mating with the DC charging connector, the DC terminals including a proximity terminal and a ground terminal, the proximity terminal including a terminating end received in the rear cavity, the ground terminal including a terminating end received in the rear cavity;
AC terminals received in the corresponding AC terminal channels for mating with the AC charging connector; and
a proximity resistor assembly received in the rear cavity, the proximity resistor assembly including a resistor, a first resistor conductor coupled between the resistor and the terminating end of the proximity terminal, and a second resistor conductor coupled between the resistor and the terminating end of the ground terminal.

2. The charging inlet assembly of claim 1, wherein the housing includes a nest in the rear cavity proximate to the DC terminal channels holding the proximity terminal and the ground terminal, the resistor being received in the nest.

3. The charging inlet assembly of claim 1, wherein the housing includes an end wall at a front of the rear cavity, the proximity terminal and the ground terminal passing through the end wall into the rear cavity, the resistor being coupled to the end wall, the first and second resistor conductors being coupled to the end wall.

4. The charging inlet assembly of claim 1, wherein the first resistor conductor includes a first resistor contact having a mating beam engaging the terminating end of the proximity terminal, the second resistor conductor including a second resistor contact having a mating beam engaging the terminating end of the ground terminal.

5. The charging inlet assembly of claim 4, wherein the first resistor contact includes a terminating end terminated to a first lead of the resistor, the second resistor contact including a terminating end terminated to a second lead of the resistor.

6. The charging inlet assembly of claim 5, wherein the terminating end of the first resistor contact includes an insulation displacement contact terminated to the first lead, the terminating end of the second resistor contact including an insulation displacement contact terminated to the second lead.

7. The charging inlet assembly of claim 4, wherein the first resistor contact is press-fit into the housing, the second resistor contact being press-fit into the housing.

8. The charging inlet assembly of claim 1, further comprising a retainer assembly received in the rear cavity rearward of the proximity resistor assembly, the retainer assembly including a retainer insert holding the resistor in the cavity and a seal in the rear cavity sealingly coupled to the housing.

9. The charging inlet assembly of claim 8, wherein the seal includes seal bores receiving DC cables terminated to ends of the corresponding DC terminals, the seal being sealingly coupled to the DC cables.

10. The charging inlet assembly of claim 8, wherein the retainer assembly includes a cover coupled to the housing to hold the retainer insert and the seal in the rear cavity.

11. The charging inlet assembly of claim 8, further comprising DC cables and DC contacts terminated to ends of the DC cables, the DC contacts being coupled to the corresponding DC terminals.

12. The charging inlet assembly of claim 11, wherein the retainer insert includes bores that receive the corresponding DC contacts, the retainer insert including latches extending into the bores to secure the DC contacts in the bores.

13. The charging inlet assembly of claim 11, wherein the DC contacts include flanges, the retainer insert including stop shoulders in the bores, the flanges being captured between the stop shoulders and the latches to retain the DC contacts in the bores.

14. A charging inlet assembly comprising:
a housing extending between a front and a rear, the housing having a DC section including DC terminal channels, the housing having an AC section including AC terminal channels, the DC section configured for mating with a DC charging connector at the front, the AC section configured for mating with an AC charging connector at the front, the housing including a rear cavity at the rear;
DC terminals received in the corresponding DC terminal channels for mating with the DC charging connector, the DC terminals including a proximity terminal and a ground terminal, the proximity terminal including a terminating end received in the rear cavity, the ground terminal including a terminating end received in the rear cavity;
AC terminals received in the corresponding AC terminal channels for mating with the AC charging connector; and
a proximity resistor assembly received in the rear cavity, the proximity resistor assembly including a resistor having a first lead and a second lead, a first resistor contact terminated to the first lead and having a mating end coupled to the terminating end of the proximity terminal, and a second resistor contact terminated to the second lead and having a mating end coupled to the terminating end of the ground terminal.

15. A charging inlet assembly comprising:
a housing extending between a front and a rear, the housing having a DC section including DC terminal channels, the housing having an AC section including AC terminal channels, the DC section configured for mating with a DC charging connector at the front, the AC section configured for mating with an AC charging connector at the front, the housing including a rear cavity at the rear;
DC terminals received in the corresponding DC terminal channels for mating with the DC charging connector, the DC terminals including a proximity terminal and a ground terminal, the proximity terminal including a terminating end received in the rear cavity, the ground terminal including a terminating end received in the rear cavity;

AC terminals received in the corresponding AC terminal channels for mating with the AC charging connector;

a proximity resistor assembly received in the rear cavity, the proximity resistor assembly including a resistor, a first resistor conductor coupled between the resistor and the terminating end of the proximity terminal, and a second resistor conductor coupled between the resistor and the terminating end of the ground terminal; and a retainer assembly received in the rear cavity rearward of the proximity resistor assembly, the retainer assembly including a retainer insert holding the resistor in the rear cavity and a seal in the rear cavity being sealing coupled to the housing.

16. The charging inlet assembly of claim 15, wherein the seal includes seal bores receiving DC cables terminated to ends of the corresponding DC terminals, the seal being sealingly coupled to the DC cables.

17. The charging inlet assembly of claim 15, wherein the retainer assembly includes a cover coupled to the housing to hold the retainer insert and the seal in the rear cavity.

18. The charging inlet assembly of claim 15, further comprising DC cables and DC contacts terminated to ends of the DC cables, the DC contacts being coupled to the corresponding DC terminals.

19. The charging inlet assembly of claim 18, wherein the retainer insert includes bores that receive the corresponding DC contacts, the retainer insert including latches extending into the bores to secure the DC contacts in the bores.

20. The charging inlet assembly of claim 18, wherein the DC contacts include flanges, the retainer insert including stop shoulders in the bores, the flanges being captured between the stop shoulders and the latches to retain the DC contacts in the bores.

\* \* \* \* \*